(12) United States Patent
Adler et al.

(10) Patent No.: US 11,875,421 B2
(45) Date of Patent: Jan. 16, 2024

(54) DISTRIBUTING A WAREHOUSE TASK FROM A WAREHOUSE MANAGEMENT HUB TO A PROGRAMMABLE LOGIC CONTROLLER IN A DISTRIBUTED WAREHOUSE SYSTEM

(71) Applicant: SAP SE, Walldorf (DE)

(72) Inventors: Tobias Adler, Viernheim (DE); Joerg Michaelis, Düsseldorf (DE); Andreas Daum, Heidelberg (DE)

(73) Assignee: SAP SE, Walldorf (DE)

( * ) Notice: Subject to any disclaimer, the term of this patent is extended or adjusted under 35 U.S.C. 154(b) by 117 days.

(21) Appl. No.: 17/453,943

(22) Filed: Nov. 8, 2021

(65) Prior Publication Data

US 2022/0148117 A1 May 12, 2022

(30) Foreign Application Priority Data

Nov. 10, 2020 (EP) ..................................... 20206695

(51) Int. Cl.
*G06Q 50/28* (2012.01)
*G06Q 10/0631* (2023.01)
(Continued)

(52) U.S. Cl.
CPC ....... *G06Q 50/28* (2013.01); *G06Q 10/06311* (2013.01); *G06Q 10/08* (2013.01); *G06Q 10/087* (2013.01); *H04L 69/326* (2013.01)

(58) Field of Classification Search
CPC .. G06Q 50/28; G06Q 10/06311; G06Q 10/08; G06Q 10/087; H04L 69/326; B65G 1/1371; G05B 2219/32392
See application file for complete search history.

(56) References Cited

U.S. PATENT DOCUMENTS

| 7,234,002 B2 * | 6/2007 | Lewis | H04L 67/12 |
| | | | 709/246 |
| 7,518,511 B1 * | 4/2009 | Panja | G07G 1/009 |
| | | | 340/568.1 |

(Continued)

FOREIGN PATENT DOCUMENTS

| CN | 110032157 A | 7/2019 |
| EP | 3354598 A1 | 8/2018 |

OTHER PUBLICATIONS

Communication: "Extended European Search Report", dated Apr. 12, 2021 (dated Apr. 12, 2021), European Patent Office, for European Application No. 20206695.7-1202, 9pgs.

*Primary Examiner* — Michael Jared Walker
(74) *Attorney, Agent, or Firm* — Buckley, Maschoff & Talwalkar LLC

(57) ABSTRACT

A method, a medium, and a system for distributing a warehouse task from a warehouse management hub to a programmable logic controller comprise receiving at least one warehouse task at a warehouse management hub including attributes for physically transferring at least one product into a warehouse, out of the warehouse or within the warehouse, determining, by the warehouse management hub and based on the attributes of the warehouse task, one of a plurality of warehouse management devices for processing the warehouse task, sending, by the warehouse management hub, the warehouse task to the determined warehouse management device, identifying, by the determined warehouse management device and based on the attributes of the warehouse task, a first one of a plurality of programmable logic controllers, and sending, by the determined warehouse management device, a message including information for carrying out the warehouse task to the identified programmable logic controllers.

19 Claims, 7 Drawing Sheets

(51) Int. Cl.
*G06Q 10/08* (2023.01)
*G06Q 10/087* (2023.01)
*H04L 69/326* (2022.01)

(56) References Cited

U.S. PATENT DOCUMENTS

| | | | |
|---|---|---|---|
| 7,761,319 B2* | 7/2010 | Gil | G06Q 10/0631 |
| | | | 705/7.38 |
| 8,650,132 B2* | 2/2014 | McClurg | G06Q 10/06 |
| | | | 705/336 |
| 9,733,633 B2* | 8/2017 | Wickham | G05B 13/041 |
| 2002/0091815 A1* | 7/2002 | Anderson | G06Q 10/06 |
| | | | 707/999.107 |
| 2013/0123964 A1* | 5/2013 | Cooper | G06F 3/067 |
| | | | 700/97 |
| 2013/0297055 A1* | 11/2013 | Wang | G05B 19/41865 |
| | | | 700/96 |
| 2014/0156472 A1* | 6/2014 | Stuntebeck | G06Q 10/087 |
| | | | 705/28 |
| 2017/0083852 A1* | 3/2017 | Adler | G06Q 10/0631 |
| 2017/0116564 A1* | 4/2017 | Luo | G06Q 10/083 |
| 2017/0153632 A1* | 6/2017 | Cooper | G06Q 10/0633 |
| 2020/0231185 A1* | 7/2020 | Shiu | G06Q 50/32 |
| 2022/0291672 A1* | 9/2022 | Shiu | G06Q 50/30 |

* cited by examiner

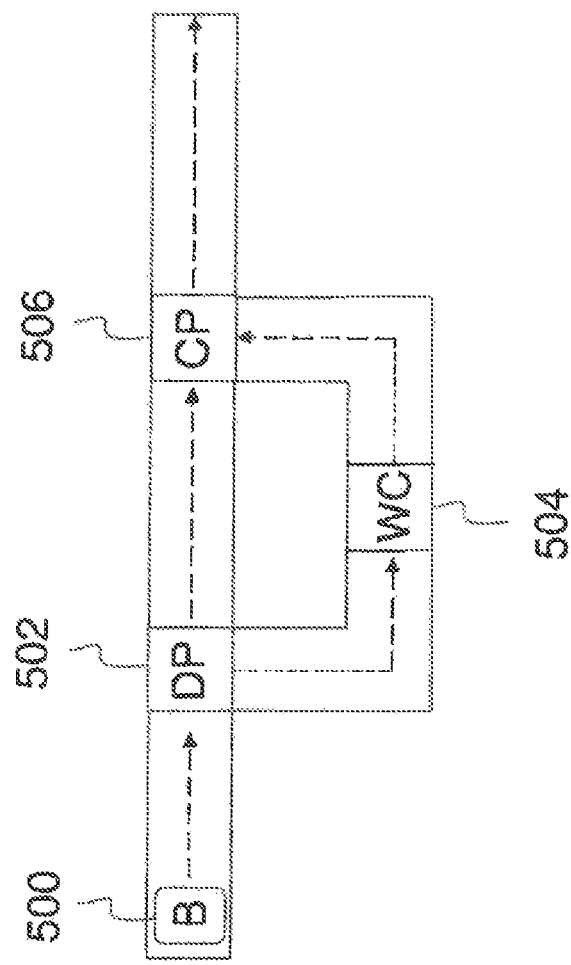

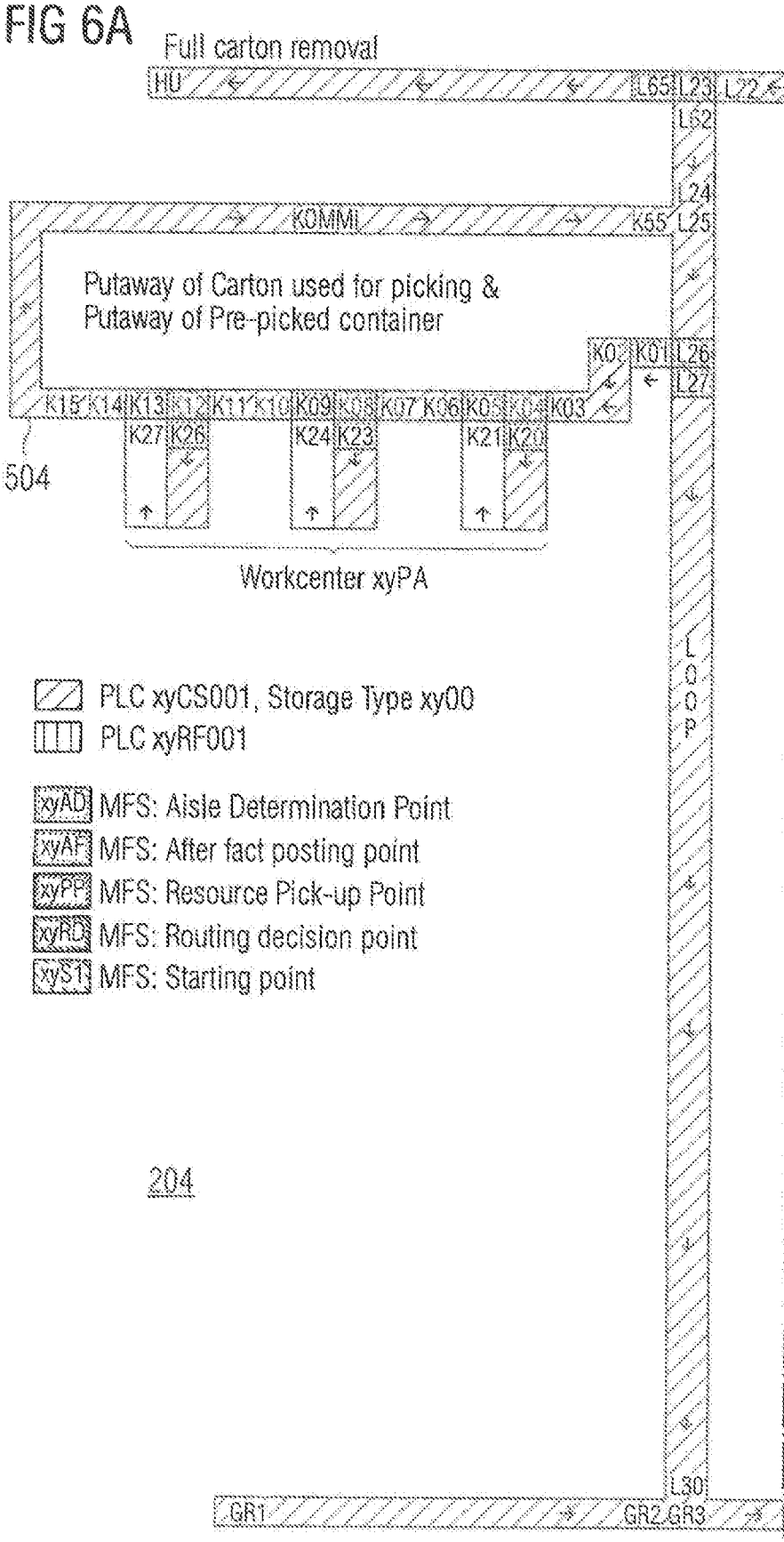

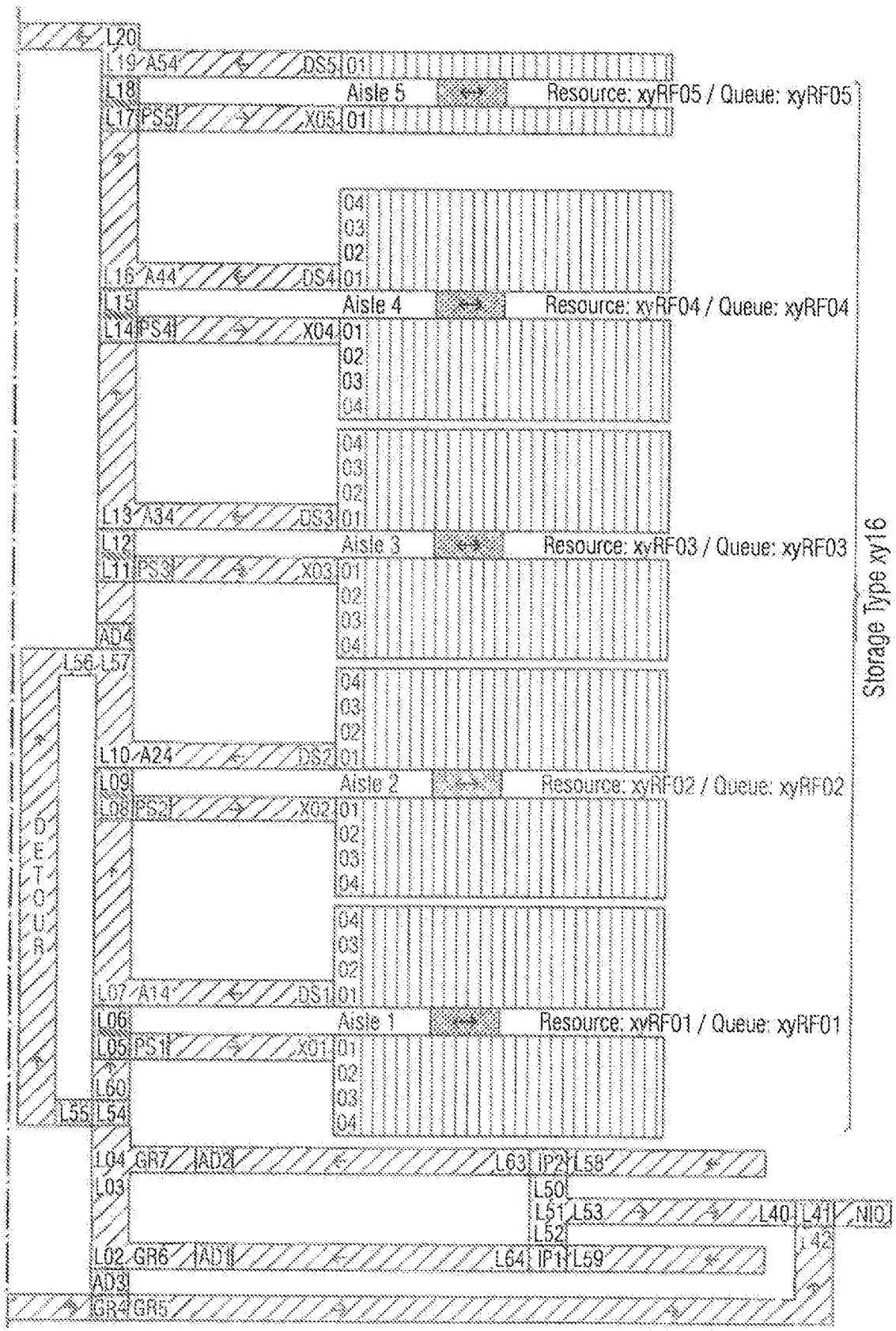

DISTRIBUTING A WAREHOUSE TASK FROM A WAREHOUSE MANAGEMENT HUB TO A PROGRAMMABLE LOGIC CONTROLLER IN A DISTRIBUTED WAREHOUSE SYSTEM

CROSS-REFERENCE TO RELATED APPLICATIONS

The present application claims priority under 35 U.S.C. § 119(a) to European Patent Application No. 20 206 695.7, filed Nov. 10, 2020, the contents of which are incorporated herein by reference for all purposes.

DESCRIPTION

The present disclosure relates to warehouse management, more particularly to processing and distribution of a warehouse task within a distributed warehouse management system.

In an automated warehouse, which may include an automated storage and retrieval system (AS/RS), a warehouse management system (WMS) may control transfer of products (or handling units containing products) into, out of and within the warehouse.

The AS/RS may include computer-controlled systems for automatically placing and retrieving loads from defined storage locations. The AS/RS may include one or more subsystems, such as, unit-load, mini-load, and mid-load, as well as horizontal/vertical carousels, and vertical lift modules. The AS/RS may use a horizontal or vertical aisle. In particular, destinations (e.g., storage bins) within the automated warehouse may be grouped around one or more aisles.

The WMS may communicate with programmable logic controllers (PLC), which may control the movement of goods (products) within the automated warehouse via the AS/RS.

A PLC may be a digital system that manages the movement of goods in the automated warehouse. The PLC may be ruggedized for an industrial environment and may be rack mountable. The PLC may use one or more positioning systems (i.e., warehouse positioning systems) of the AS/RS such as stacker cranes, elevating transfer vehicles, vertical lift modules, conveyors, rack feeders, or shuttle cars. The PLC may read a signal from a connected input device (e.g., computer terminal) and use control instructions to communicate with one of the positioning systems.

The PLC may include components such as
a processor unit (CPU), which may interpret inputs, execute programs stored in memory and send output signals,
a power supply, which may convert alternating current (AC) to direct current (DC),
a memory unit storing data from inputs and a program to be executed by the processor, an input and output interface, where the controller receives and sends data from/to external devices,
a communications interface to receive and transmit data via communication networks.

The PLC may further include a programming device to develop and download programs. The PLC may also include an operating system, e.g., a real-time operating system such as OS-9 or VxWorks.

The PLC may be an embedded system rather than a general purpose computer. In particular, the PLC may control physical operations of the warehouse and have real-time computing constraints (i.e., on the order of milliseconds or microseconds to provide a response within a certain deadline).

The automated warehouse (also referred to as "the warehouse") may be used for stocking goods to be used later for supply chain operations. The automated warehouse may be a building or closed space for storage and handling of goods (i.e., products). The automated warehouse may include conveyor belts, sorters, lifts, shuttles, and high racks. Each movement of goods from one point in the warehouse (A) to another point in the warehouse (B) may be controlled by the WMS. The movement may be effected by the AS/RS. A WMS may connect to multiple PLCs. This connection may be via TCP/IP in a local area network (LAN), i.e., the network latency between the WMS and the PLCs may be relatively low (e.g., RTT less than 10-20 ms, as discussed below).

In the automated warehouse, a request may be sent from the WMS to one of the PLCs. The PLC may process the request and send a follow-up or a confirmation upon completion. The PLC can also send a request to the WMS, which the WMS may confirm or follow-up (e.g., request further information). The requests, follow-ups and confirmations may be exchanged as messages (also referred to as telegrams).

For example, a handling unit (HU) may move within the warehouse toward a communication point (e.g., a decision point). The decision point may be associated with a PLC. A request sent from the PLC to the WMS could be a position notification for the HU, requesting the next destination for the handling unit or a direction in which to send the handling unit. The request may be sent when the handling unit reaches the decision point. The WMS may decide, based on a routing configuration, context information like HU data, equipment state, and open tasks, where the handling unit should be directed/routed, e.g., to a work center or to the next communication point (CP). The decision of the WMS may be communicated as a follow-up to the PLC.

It may be desirable to quickly and efficiently exchange messages regarding the flow of HUs in the warehouse. An additional millisecond to send a message may be significant. For example, an HU may be moved quickly via a conveyor belt (or other positioning system) and arrive at a decision point (e.g., scanner) followed by alternate paths (diverts) in different directions. Accordingly, there may be only hundreds or even tens of milliseconds available to choose a path for the HU at the decision point. If the path is not chosen in time, the HU may be moved in a default direction or the conveyor belt may be stopped until instructions are received. The default direction may be incorrect—causing the HU to take longer to reach its destination or requiring manual intervention. Stopping the conveyor belt may reduce the efficiency of the automated warehouse. This could be particularly problematic if multiple HUs do not receive instructions in time.

In addition, it may be desirable to provide a distributed warehouse system to manage multiple warehouses. The distributed warehouse management system may include a warehouse management hub from which system management functions can be performed. The warehouse management hub may include some or all of the functionality of the WMS, as described above.

Due to the distance between the different locations in the distributed warehouse system, communications may be subject to significant network latency. In particular, when packets travel over a wide area network (WAN), there may be greater network latency than when the packets travel over a local area network (LAN). For example, the round-trip transmission time (RTT) over the LAN may be less than 10 milliseconds (ms), while the RTT for the WAN may be greater than 10 ms (e.g., more than three times the LAN RTT, or more than five times the LAN RTT). In some cases, the WAN RTT may be over 100 ms or over 250 ms.

The WAN may include one or more of the following: a part of the internet, a virtual private network (e.g., extending a private network across a public network), multiple (e.g., more than 3) subnets. Communications on the WAN may pass through at least one router (e.g., device at the network layer of the open systems interconnection—OSI model). The LAN may have one or more of the following characteristics:

it is a single subnet (possibly using non-routable IP addresses, such as an address in the range of 10.0.0.0-10.255.255.255) or no more than 3 subnets,
it does not include a part of the internet,
it includes at least one network switch (e.g., device at the data link layer of the OSI model),
it does not include a router (e.g., device at the network layer of the OSI model),
it does not include a virtual private network.

The WAN and LAN may also use different protocols. For example, the LAN may use one or more of the following: Wi-Fi (IEEE 802.11), Ethernet (IEEE 802.3), Token Ring (IEEE 802.5), Fiber Distributed Data Interface (FDDI). The WAN may use one or more of the following: cell relay (e.g., asynchronous transfer mode), digital subscriber line (DSL), Ethernet (e.g., gigabit Ethernet). Communications over the WAN may include Fiber-optic communication.

In addition to the RTT, packet loss or errors may be problematic. For example, if a packet gets lost, the packet has to be resent, which takes time. The probability of such an issue increases with the number of hops between a sender and a receiver, and the number of hops often increases with distance.

Hence, PLCs may be unable to receive responses to requests sufficiently quickly (e.g., in less than one second), resulting in errors or reduced efficiency of the automated warehouse. In particular, HUs might not be directed to the correct communication point or be routed to the correct destination.

Accordingly, it may be a problem to compensate for network delay (i.e., network latency) when a distributing warehouse task in a distributed warehouse system. The network delay may result from the distance between a warehouse management hub and a PLC that controls execution of the warehouse task. In particular, the network delay may result from use of a WAN for communication between the warehouse management hub and the warehouse including the PLC.

One conventional solution to this problem is to have a full WMS at each warehouse, such that only some shared data is stored centrally. This solution solves problems with network latency, since processing is performed locally and responses are received by the PLCs from a local device. However, this approach has disadvantages including additional hardware, maintenance and staffing costs. Further, this solution may result in a more complex system, since processing and responsibility are distributed and no single part of the system has the whole operational picture.

Hence, a different solution that addresses the problems above may be desirable.

According to an aspect, a computer-implemented method for distributing a warehouse task from a warehouse management hub to a programmable logic controller in a distributed warehouse system is provided.

The method comprises receiving the warehouse task at the warehouse management hub, the warehouse task including attributes for physically transferring at least one product into a warehouse, out of the warehouse or within the warehouse. The method further comprises determining, by the warehouse management hub and based on the attributes of the warehouse task, one of a plurality of warehouse management devices for processing the warehouse task. The warehouse management hub is communicably connected to each of the warehouse management devices via a wide area network (e.g., the internet).

The method further comprises sending, by the warehouse management hub, the warehouse task to the determined warehouse management device. The method further comprises identifying, by the determined warehouse management device and based on the attributes of the warehouse task, a first one of a plurality of programmable logic controllers. The determined warehouse management device is communicably connected to each of the programmable logic controllers via a local area network. The method further comprises sending, by the determined warehouse management device, a message including information for carrying out the warehouse task to one of the programmable logic controllers based on the identification of the first one of the programmable logic controllers.

Accordingly, communication between the warehouse management hub and the warehouse management devices may be carried out via the WAN connecting the warehouse management hub to the warehouse management devices. The warehouse management devices may also be referred to as edge devices.

In some cases, a warehouse includes multiple warehouse management devices. For example, the warehouse management devices may be responsible for different parts of a large warehouse and the responsibility of each warehouse management device may be tracked by the warehouse management hub. Additionally or alternatively, the warehouse may include redundant warehouse management devices (e.g., a primary and a backup).

The warehouse management hub might not communicate directly with PLCs. Instead, direct communication with PLCs may be carried out by the warehouse management device via a respective LAN. Accordingly, direct communication with PLCs may be significantly faster than if the warehouse management hub communicated with the PLCs using the WAN.

The network latency (i.e., network delay or communication latency) between the warehouse management device and the warehouse management hub may be greater than the latency between the warehouse management device and the programmable logic controller.

More specifically the network latency between the warehouse management hub and the warehouse management device may be at least 3 times, at least 5 times, at least 10 times or at least 25 times the latency between the warehouse management device and one of the programmable logic controllers connected to the warehouse management device.

In some cases, there is only one warehouse management hub in the distributed warehouse system.

The warehouse management hub may be provided as part of a cloud computing environment, i.e., the warehouse management hub may be implemented as software as a service (SaaS), also referred to as web-based software. The cloud computing environment may provide a shared pool of configurable computing resources (e.g., networks, network bandwidth, servers, processing, memory, storage, applications, virtual machines, and services) that can be rapidly provisioned and released with minimal management effort or interaction with a provider of the computing resources.

The cloud computing environment (i.e., the cloud environment or the cloud) may have one or more of the following characteristics: scalability, multitenancy, performance monitoring, virtual computing resources that are dynamically assignable to different users according to demand, multiple redundant sites, multiple virtual machines, as well as network accessibility (e.g., via. the Internet) from multiple locations (e.g., via a web browser) and devices (e.g., mobile device or PC).

In comparison to an on-premises computing environment, the cloud computing environment may have a higher ratio of virtual computing resources to physical computing resources (e.g., a higher ratio of virtual machines to physical machines). For example, the ratio of virtual computing resources (e.g., machines) to physical computing resources may be at least 10:1, at least 20:1 or at least 30:1 in the cloud computing environment. In contrast, an on-premises computing environment may have less than four virtual computing resources (e.g., machines) per physical computing resource.

The warehouse management hub may be implemented as a central management server for managing the warehouse management devices, and may be accessible via a computing device (e.g., terminal) via the WAN or another computer network. In contrast to the PLCs and the warehouse management devices, the warehouse management hub might not be located in a warehouse.

The warehouse management device may include a subset of warehouse management system functionality, i.e., a subset of the functionality of the warehouse management hub. The warehouse management device may be less capable than the warehouse management hub, wherein the warehouse management device has less processing power and/or less storage capacity than the warehouse management hub.

In some cases, a limited amount of data is stored on the warehouse management devices. Some or all of the data may be deleted after it is no longer needed, e.g., after a corresponding warehouse task is carried out or at the end of the day when the warehouse tasks for the day have been carried out. Further, a warehouse management device might only store upcoming task data for a specified period, e.g., for at least the next hour, at least the next day, at least the next 3 days, at least the next week or at least the next two weeks.

More data may be maintained at the warehouse management hub. For example, data for several previous years of warehouse tasks for each warehouse and/or all available upcoming task data may be maintained at the warehouse management hub.

The warehouse management device may be configured to communicate with the programmable logic controllers using messages, e.g., messages delimited within a stream of TCP segments, Transport Protocol Data Units (TPDUs), Web-Socket or SOAP messages. Messages may be delimited in the stream of TCP segments by fixing the size of the messages (e.g., a specified number of bytes within one or more segments or a specified number of segments) or by specifying a delimiting character (e.g., a designated special character or boundary character to mark the end of the message). The TPDUs may be encapsulated in TPKTs, e.g., as specified in RFC 2126 or RFC 1006. The messages may have an average size of between 100 and 200 bytes.

Multiple messages may be contained within a TCP segment or a message may span one or more TCP segments. The message may be sent according to a message protocol. The message protocol may specify a transport protocol (e.g., TCP) and/or how message boundaries are delimited (e.g., via a fixed sized for the message or using a specified special character).

The message protocol may specify a quality of service level (e.g., best effort, at least once, exactly once, and exactly once in order). The message protocol may provide one or more features related to platform independence (i.e., independence of a computer system storage format: big-endian format or little-endian format), reliable queueing, message pattern, transactions, security. The message protocol may use a structured format intended for machine-based processing or a text-based format (human-readable, e.g., encoded as ASCII or Unicode).

In one example, the warehouse management hub may be located in a first country (e.g., Germany) and the warehouse management devices may be located in three different countries (e.g., Spain, Italy, China) that are different from the first country.

The determined warehouse management device may the device located in Spain, because the warehouse task includes a destination identifier associated with the warehouse in Spain.

The warehouse management hub may comprise an interface for managing a plurality of warehouse management devices and a plurality of programmable logic controllers. The warehouse management hub may further comprise a database.

In some cases, management of the distributed warehouse management system may be carried out by interacting with the warehouse management hub. The warehouse management hub may then distribute a new configuration to the warehouse management devices or update existing configuration devices. The warehouse management devices might not have an interface that can be used to modify or reconfigure warehouse management functions.

The warehouse management device provides a way to mitigate the effects of network latency for communication between the warehouse management hub and the PLCs, while avoiding much of the cost and complexity associated with having all warehouse management system functionality at each warehouse. In particular, the warehouses management device may include information necessary for responding to most PLC requests (e.g., about 80% of PLC requests) so that it is typically unnecessary to wait for a response from the warehouse management hub. In this way, sub-second response times to PLC requests can usually be provided. It may be desirable to arrive at an average response time to PLC requests on the order of 100 ms or less than 100 MS, Determining one of the warehouse management devices for processing the warehouse task may be based on one or more of the following:
 a characteristic of the product,
 a characteristic of a handling unit containing the product,
 a destination specified by the warehouse task.

The characteristics of the product or handling unit may include physical characteristics.

For example, the warehouse management hub may manage a first warehouse management device, a second warehouse management device and a third warehouse management device. The first warehouse management device may be located in a warehouse where household goods (specified by the product characteristic) are stored, the second warehouse management device may be located in a warehouse where auto parts are stored and the third warehouse management device may be located in a warehouse where weapons are stored.

As another example, the first warehouse management device may be located in a warehouse where shipping containers (specified by the handling unit characteristic) are stored, the second warehouse management device may be located in a warehouse where crates are stored and the third warehouse management device may be located in a warehouse where boxes larger than a specified size are stored.

As yet another example, it may be possible to correlate the destination (or a destination type) specified by the warehouse task with a particular warehouse. For example, the destination may specify an identifier of a storage bin in a particular warehouse or a type of storage bin (capable of holding HUs above a specified volume, rack storage, bulk storage, hazardous substance storage, etc.) of a particular warehouse.

In addition or alternatively, the warehouse task may include location information indicating a warehouse management device (e.g., if the warehouse task indicates Spain and there is only one warehouse management device in Spain, then this warehouse management device may be determined).

Each handling unit may comprise packaging and at least one product. Each handling unit may include one or more of the following characteristics (i.e., attributes): a handling unit identifier, dimensions, weight, volume, status, products and quantities, packaging characteristic (e.g., material, packaging specification, packaging type).

The packaging type may include one of the following: a box, a pallet, a crate, a wire box, a shipping container, a truck. At least one handling unit may comprise a further (different) handling unit, e.g., a shipping container including pallets or boxes or a pallet including boxes.

The characteristic of the handling unit may be one of the following: dimensions (length, width, height, etc.), weight, volume, packaging characteristic.

Each warehouse management device may be responsible for a specified (i.e., predetermined or predeterminable) set of destinations. In some cases, each destination has one or more destination characteristics. The warehouse management device may be determined by comparing at least one of the destination characteristics with the characteristic of the handling unit.

Destination characteristics may include one or more of the following: a destination identifier, physical capacity, weight tolerance, volume, dimensions (length, width, height).

In addition, the destination characteristics may be dependent on a storage section including the destination. For example, destinations may be characterized by being in a storage section for fast-moving goods (goods that are in the warehouse for a relatively short period, e.g., less than 1 week or less than 3 days) or slow-moving goods (goods that are in the warehouse for a relatively long period, e.g., more than 3 days or more than 1 week).

The destination may be a storage bin, i.e., a relatively small storage space or a spatial unit to store a product.

Comparing the destination characteristic with the characteristic of the handling unit may include determining whether the destination has the capacity to hold the handling unit or a part of the handling unit (e.g., a product or a different handling unit of the handling unit). In addition or alternatively, comparing the destination characteristic with the characteristic of the handling unit may include determining whether the destination is an efficient or desirable location for the handling unit, e.g., whether similar or identical products are already stored near (e.g., in the same storage section) or at the destination (e.g., the destination may be a storage bin for a specified product or a specified combination of products).

The information for carrying out the warehouse task included in the message may comprise one or more of the following: a handling unit identifier, a source identifier, a destination identifier, a handling unit type, a handling unit weight, a handling unit volume.

The identifiers may be numbers or alphanumeric identifiers. The identifiers may be represented as a machine-readable codes, such as a barcode or a quick response (QR) code. The identifiers may be stored in an RFID tag (e.g., the RFID tag may be attached to the HU).

In some cases, sending the message to the PLC comprises using TCP. In particular, the message may be contained in a part of a TCP segment or in one or more TCP segments.

The message may be delimited. In particular, the message may have a fixed length/size (e.g., at least 300 bytes) or a boundary (e.g., end) of the message may be delimited using a specified (e.g., predetermined or predeterminable) character. For example, a special character may be designated as termination character for the messages.

Messages may also be sent in other ways. For example, the WebSocket protocol may be used.

More particularly, when the programmable logic controller supports the WebSocket protocol, sending the message comprises using the WebSocket protocol. When the programmable logic controller does not support the WebSocket protocol, sending the message comprises using a TCP-based messaging protocol (e.g., as discussed above, or with additional features such as those specified in the Extensible Messaging and Presence Protocol—XMPP).

In some cases, each of the plurality of warehouse management devices is located in a different warehouse, i.e., each of the warehouse management devices is in a different location and is responsible for a different set of PLCs. Further, the location of the warehouse management devices may differ from the location of the warehouse management hub.

The method may further comprise receiving, by the determined warehouse management device from one of the programmable logic controllers (i.e., a first PLC), an error message. The method may further comprise determining, by the warehouse management device, a second one of the programmable logic controllers based on the error message. Sending the message may including information for carrying out the warehouse task may be based on the determination of the second one of the programmable logic controllers.

For example, the error message may indicate that a positioning system for an aisle is not operational (e.g., scheduled or unscheduled maintenance), rendering destinations (e.g., storage bins) in the aisle unusable. Accordingly, the warehouse management device may determine the second one of the PLCs so as to route the HU to a different/alternate destination. Alternatively, the error message may cause the warehouse management device to send new routing instructions to the first PLC so as to route the HU to the alternate destination.

The determining may comprise updating the warehouse management hub regarding the state of the second PLC in view of the error message and receiving alternate routing information from the warehouse management hub at the warehouse management device in response to the update.

For example, if no error message is received, the method may comprise sending, by the determined warehouse management device, a message including information for carrying out the warehouse task to the first one of the programmable logic controllers. If the error message is received, the message may be sent to the second one of the programmable logic controllers.

Accordingly, the error message may indicate that the first PLC is unavailable or that a first destination has no available capacity. Alternatively, the error message may indicate that the HU is damaged (and should therefore be routed to a different destination for damaged HUs) or that a positioning system (also referred to as a resource) associated with the first destination is unavailable. For example, the first destination may be a storage bin on aisle 1 and the positioning system for aisle 1 failed or is down for maintenance.

The error message could also indicate that a machine-readable code on the HU is unreadable or that the HU is not compatible with the first destination (e.g., too big).

The first PLC may be on a primary route of the warehouse management device.

The warehouse management device may have an alternate route including the second PLC (and possibly a second destination) and may use the alternate route upon receipt of the error message. Alternatively, the warehouse management device may receive alternate route information from the warehouse management hub after updating the warehouse management hub in view of the error message. The second PLC may attempt to carry out the warehouse task via the alternate route.

In this connection, the warehouse management device may store a routing configuration; the routing configuration may include:
- primary or default routes,
- alternative routes that can be chosen based on capacity constraints (e.g., providing alternative destinations when a preferred destination is full), errors (PLC is unavailable), empty HUs (e.g., the packaging of the HU is present but there is no product), HUs with open tasks and a specified destination, HUs with errors that cannot be resolved by a PLC (the errors may need human resolution or resolution by specialized equipment).

In some cases, the warehouse management device only stores one or more primary routes and does not store alternate routes. Instead, the warehouse management device receives alternate route information from the warehouse management hub, e.g., in response to updating the warehouse management hub regarding the state of PLCs managed by the warehouse management device.

Minimizing the information stored on the warehouse management device may save costs by allowing a device with minimal storage capacity to be used as a warehouse management device.

Routing within the warehouse may be influenced by one or more of the following: current location of a HU (e.g., an identifier of a PLC that most recently processed the HU), state of a PLC or a warehouse management device, context information of the HU (e.g., empty, error to be clarified), open tasks for the HU/content of the HU.

The routing configuration may be used as a basis to send routing instructions to a PLC in response to a status message, as discussed in more detail below.

The method may further comprise receiving, by the determined warehouse management device, location information about handling units in the warehouse from the programmable logic controllers. The method may further comprise forwarding a subset of the location information from the determined warehouse management device to the warehouse management hub.

In some cases, the forwarding is carried out as soon as the location information is received by the determined warehouse management device and/or the subset includes all of the location information. The subset of the location information may be limited to location information from a proper subset of the programmable logic controllers, wherein the programmable logic controllers of the proper subset are associated with destinations in the warehouse.

For example, the location information may refer to a PLC that is closest to the handling unit or a PLC of the plurality of PLCs that most recently processed the handling unit. More specifically, the location information may refer to a communication point of the respective PLC, i.e., a specified location in the warehouse associated with the respective PLC.

The proper subset of the PLCs may be associated with destinations (e.g., storage bins) in the warehouse. For example, there may be 50 communication points in the warehouse and 20-25 PLCs (e.g., each PLC may be responsible for one or more communications points, in some cases, at least 2 communications points). 10 of the PLCs may be associated with destinations in the warehouse. Accordingly, handling unit location information from the 10 PLCs may be forwarded from the determined warehouse management device to the warehouse management hub.

There may be multiple types of communication points including decision points (e.g., aisle or routing decision points), identification points, starting/source points, destination or end points, posting points, drop-off points (e.g., where a rack feeder or other positioning system drops/places goods onto a conveyor), pickup points (e.g., where another rack feeder picks up goods from another conveyor), clarification points, and scanners.

Decision points may be locations in the warehouse where a decision needs to be made about which direction to send a HU, e.g., a fork or a crossroads on a conveyor.

The method may further comprise updating, by the warehouse management device, the warehouse management hub regarding a state of the programmable logic controllers managed by the warehouse management device. The updating may be carried out periodically or in response to a change to the respective state or in response to a specified number of changes to the respective state.

In one example, the updating may be carried out when a specified state changes. For example, one or more PLCs in the warehouse may be designated as being high priority. If a state of one of the high priority PLCs changes, then all state information that has changed since the most recent update may be forwarded to the warehouse management hub.

The state of the programmable logic controllers may comprise: one or more connection states (connected, not connected) of the programmable logic controllers, and/or a state of one or more sources or destinations (operational, not operational) managed by the warehouse management device.

Accordingly, each warehouse management device may maintain a connection state (e.g., connection up or connection down) for each of the programmable logic controllers it is responsible for (i.e., manages). The warehouse management device may send the connection states to the warehouse management hub. The connection states may be sent periodically or when a specified number of connection states change.

In some cases, the warehouse management hub may trigger a change to the connection state, which may then be carried out by a corresponding warehouse management device. For example, the warehouse management hub may send a command to the warehouse management device to stop or start a connection to a PLC and the warehouse management device may carry out the command.

The method may further comprise receiving, by the warehouse management hub, state information from each of the warehouse management devices. The state information may include:
- a state of sources and destinations in the warehouse;
- a state of positioning systems in the warehouse;
- a state of handling units in the warehouse;
- a state of each communication point or a subset of communication points in the warehouse.

The method may further comprise registering, by the warehouse management device, with the warehouse management hub. The method may further comprise sending, by the warehouse management hub, an initial configuration to the warehouse management device in response to the registration.

The initial configuration may comprise definitions of the programmable logic controllers managed by the warehouse management device, each definition including information for sending messages to the programmable logic controller, such as an IP address and a message protocol for the PLC.

In addition or alternatively, the initial configuration may comprise routing information including sources and destinations in the warehouse, and/or at least one programmable logic controller in between each source and destination.

Registering, by the warehouse management device, with the warehouse management hub means that the warehouse management device registers itself with the warehouse management hub, i.e., the warehouse management device carries out a registration process with the warehouse management hub.

In particular, the sources and destinations may each be associated with respective PLCs and the routing information may include one or more of a respective IP address, port and message protocol for the respective PLC (e.g., the protocol may enable the port to be determined or vice versa). PLCs may also be located at communication points within the warehouse between the sources and destinations.

The initial configuration may be updated in response to state information received from a respective warehouse management device at the warehouse management hub. For example, an alternate route may be provided to the warehouse management device in response to state information indicating that a destination in the warehouse is full (i.e., has no further capacity), down for maintenance or otherwise unavailable.

Registering with the warehouse management hub comprises subscribing to warehouse tasks and/or configuration updates. In addition, elements of the initial configuration (e.g., part of the routing information) may be sent as an update.

The configuration of a respective warehouse management device may include warehouse tasks to be carried out in the near future, e.g., within a month, multiple weeks, or at least one hour. For example, a goods receipt task for a shipment scheduled in one week may be sent from the warehouse management hub to a respective warehouse management device. In this way, the warehouse management device may be able to communicate with PLCs to handle the goods receipt without consulting the warehouse management hub.

Accordingly, the warehouse management hub may maintain routing information for all warehouse management devices. The warehouse management hub may update the routing information, e.g., based on status or update messages received from the warehouse management devices, or based on changes to the routing information initiated via the warehouse management hub. For changes carried out at the warehouse management hub, their implementation at one or more respective warehouse management devices may be delayed, e.g., according to a start date or a state of the respective warehouse management device. The warehouse management hub may send the updated routing information to the warehouse management devices, e.g., upon receipt of a status message or a specified number of status messages.

In some cases, the attributes of the warehouse task include one or more of the following:
- at least one handling unit identifier and/or at least one product identifier,
- a source identifier, and
- a destination identifier or a destination type.

The destination type may be associated with attributes (i.e., characteristics) of handling units that can be processed at destinations associated with the destination type.

Warehouse tasks may be grouped into six categories:
- picking warehouse tasks are used to move a quantity of the identified product from a source to a destination (e.g., a packing station) in order to remove the quantity of the product from the warehouse,
- putaway warehouse tasks are used to move a quantity of the identified product from a source to a destination (e.g., a storage bin) in order to store the product in the warehouse,
- internal goods movement warehouse tasks are used to move a quantity of the identified product from a source (e.g., a storage bin or a handling unit) to a destination for replenishment, ad hoc movement, etc.

The warehouse task may be a product warehouse task or a handling unit warehouse task. The product warehouse task may identify a product, a product quantity, a source and a destination. The product warehouse task may be used to transfer products inside, outside or within the warehouse. The handling unit warehouse task may include a handling unit identifier, a source and a destination. The handling unit warehouse task might not include a quantity. In addition to the transfers of the product warehouse task, the handling unit warehouse task may also be used for loading and unloading.

In the context of the present disclosure, source may refer to a source storage bin (or handling unit) and destination may refer to a destination storage bin, unless otherwise indicated.

For example, when a truck arrives at a loading dock of the warehouse with 100 new HUs (e.g., boxes of computer peripherals/ancillary devices), the warehouse management device may send state information to the warehouse management hub. The warehouse management hub may then issue a putaway warehouse task to the warehouse management device, which may then route the putaway warehouse task (using existing route information or route information received with the task) to a respective PLC at a communication point proximate to the loading dock.

In some cases, the method further comprises receiving, at the warehouse management device, a status message from one of the programmable logic controllers corresponding to a decision point in the warehouse, the status message indicating that a handling unit has arrived at the programmable logic controller. The method may further comprise sending, from the warehouse management device, a response message including routing instructions to the programmable logic controller in response to the status message.

In this context, the status message broadly describes messages providing status information. These messages may have other type designations (e.g., request, scanner or identification point).

The routing instructions may be computed from one of the following: routing data that was on the warehouse management device at the time the status message was received, or routing data received from the warehouse management hub after the status message was received.

The routing data may include a connection status of at least one programmable logic controller. The routing data may include a status of potential destinations of (destinations capable of processing) the handling unit. The routing data may indicate that the potential destination is unavailable (full, undergoing maintenance, in an error state).

The routing instructions may specify another PLC (i.e., a further or different PLC in comparison to the PLC at which the HU arrived). In particular, the routing instructions may specify a path selection, a next CP or a next PLC for the HU on the way to its destination (where the destination is specified in the warehouse task). For example, the routing instructions may specify a path or direction. This could be in the form of a number or character designation indicating one of multiple available paths to the PLC (e.g., 0 designates a first path, 1 designates a second path, etc.). In other cases, the routing instructions may specify an IP address of the other PLC.

Typically, the HU passes through multiple communication points on the way to its destination. The routing instructions may determine which of multiple CPs that the HU is directed to.

The method above may be implemented as a computer program (or computer program product) comprising instructions that, when the program is executed by a computer, cause the computer to carry out the method of any one of the preceding claims.

The method above may also be implemented as (or tangibly embodied in) a computer-readable medium storing the computer program.

According to another aspect, a distributed warehouse management system for distributing at least one warehouse task from a warehouse management hub to a programmable logic controller is provided.

The system comprises the warehouse management hub. The system further comprises a plurality of warehouse management devices. Each warehouse management device is connected to the warehouse management hub via a wide area network. The system further comprises a plurality of programmable logic controllers. Each programmable logic controller is connected to one of the warehouse management devices via a local area network.

The warehouse management hub is configured to receive the warehouse task, the warehouse task including attributes for physically transferring at least one product into a warehouse, out of the warehouse or within the warehouse. The warehouse management hub is further configured to determine, based on the attributes of the warehouse task, one of the warehouse management devices for processing the warehouse task. The warehouse management hub is further configured to send the warehouse task to the determined warehouse management device. The determined warehouse management device is configured to identify, based on the attributes of the warehouse task, a first one of the plurality of programmable logic controllers, and send a message including information for carrying out the warehouse task to one of the programmable logic controllers based on the identification of the first one of the programmable logic controllers.

In the present disclosure, the terms "attribute" and "characteristic" are used interchangeably.

The distributed warehouse management system described above may have one or more of the following advantages.

The warehouse management devices can autonomously react to requests (e.g., routing requests) sent by the PLCs in a timely manner. In other words, time critical interaction with PLCs is handled by the warehouse management devices. Accordingly, there is no significant network latency and no complex logic that has to be executed for the warehouse management device to respond to requests.

The usage of the warehouse management devices in conjunction with the warehouse hub can be seen as a hybrid approach (or hybrid cloud approach) between having a central WMS that performs management functions for all warehouses and having local WMS installations for each warehouse.

The latency of communications with the WAN-based warehouse management hub, possibly being distributed across multiple locations (as described in the context of the cloud computing environment above), is mitigated via the use of warehouse management devices. Without the warehouse management devices, the latency would be likely to lead to unacceptable performance when responding to requests from PLCs. With the warehouse management devices, the network latency for the warehouse management hub may become irrelevant.

With maintenance of routing information (routing data) and routing logic (code or instructions for the router) in the warehouse management hub, costs may be significantly lower compared to multiple decentral WMSs. Routing logic may also include program code specific to an individual warehouse. The routing logic may be maintained in the hub and automatically deployed to the edge devices. Accordingly, there is no need to maintain data for a long period in the edge devices. Instead, data may be distributed to the edge devices as needed and deleted automatically when it is no longer needed.

As the warehouse management devices are physically close to the PLCs—possibly in the same subnet of a LAN including the PLCs—there is no significant latency (e.g., 10-20 ms RTT or less). In addition, the warehouse management devices may be able to concentrate on responding to requests from PLCs and do not need to take care of other tasks. Thus, response times and processing times may be fast enough to ensure that PLCs can route HUs efficiently within the warehouse.

In some cases, the warehouse management devices may communicate with further devices in the warehouse in addition to PLCs. For example, the warehouse management devices may communicate directly with positioning systems or with production machinery, measuring devices (e.g., scales for weighing), robots (e.g., for parallelizing).

The performance of the warehouse management hub is not directly affected by traffic from the PLCs, since the requests from PLCs are handled by the warehouse management devices.

Monitoring (e.g., viewing HUs as they move through the warehouse, checking the status of storage bins, etc.) may take place at the warehouse management hub based on information (e.g., status messages) provided by the warehouse management devices. This also helps reduce costs.

Since the warehouse management devices receive information to react on communications from PLCs, a certain level of autonomy is achieved, so that the automated warehouse can still be operated even if the warehouse management hub cannot be reached for a period of time.

Since each warehouse management devices only receive tasks within certain boundaries, the respective warehouse management device can be lightweight, i.e., without high computing power or storage capacity. Accordingly, the warehouse management device may have different hardware in comparison to what is required for the warehouse management hub (e.g., one or more capable servers). The warehouse management device could be implemented as a general-purpose computer or an embedded device (i.e., an embedded system).

In some cases, the warehouse management device may be implemented using the same hardware (but different software) as a PLC. Alternatively, the warehouse management device may be implemented using different hardware that is compatible with a PLC (e.g., the same storage capacity but more working memory and a more capable processor). The warehouse management device may also be implemented using virtualization, particularly OS-virtualization in which multiple isolated user space instances are provided. For example, the warehouse management device may include multiple containers, e.g., a primary container and a failover/backup container. Specifically, Docker containers may be used.

Local redundancy of warehouse management devices could be introduced (e.g., a primary warehouse management device and a backup warehouse management device).

Accordingly, communication between the warehouse management device and PLCs may become: quicker (compared to communication over a WAN), since there is no significant network latency, less expensive (particularly in comparison to solutions involving full WMS functionality at each warehouse), more robust, as system outages can be reduced (particularly in comparison to a system in which PLCs are communicated with and controlled over a WAN), cloud implementations of the warehouse management hub are workable to operate automated warehouses.

The costs mentioned above may include total cost of investment (TCI) and/or total cost of ownership (TCO).

The subject matter described in this disclosure can be implemented as a method or on a device, possibly in the form of one or more computer programs (e.g., computer program products). Such computer programs may cause a data processing apparatus to perform one or more operations described in the present disclosure.

The subject matter described in the present disclosure can be implemented in a data signal or on a machine readable medium, where the medium is embodied in one or more information carriers, such as a CD-ROM, a DVD-ROM, a semiconductor memory, or a hard disk. In particular, disclosed subject matter may be tangibly embodied in a machine (computer) readable medium.

In addition, the subject matter described in the present disclosure can be implemented as a system including at least one processor, and a memory coupled to the processor. The memory may encode one or more programs to cause the processor to perform one or more of the methods described in the application. Further subject matter described in the present disclosure can be implemented using various machines.

Details of one or more implementations are set forth in the exemplary drawings and description that follow. Other features will be apparent from the description, the drawings, and from the claims.

BRIEF DESCRIPTION OF THE FIGURES

FIG. 4 provides a geographic perspective on components of the distributed warehouse system.

FIG. 5 shows a simple example of a box moving toward a decision point, where a decision will be made about further progress of the box.

FIG. 6A and FIG. 6B show a simplified layout of a warehouse including communication points and aisles.

DETAILED DESCRIPTION

In the following text, a detailed description of examples will be given with reference to the drawings. Various modifications to the examples may be made. In particular, one or more elements of one example may be combined and used in other examples to form new examples.

Figure 1:
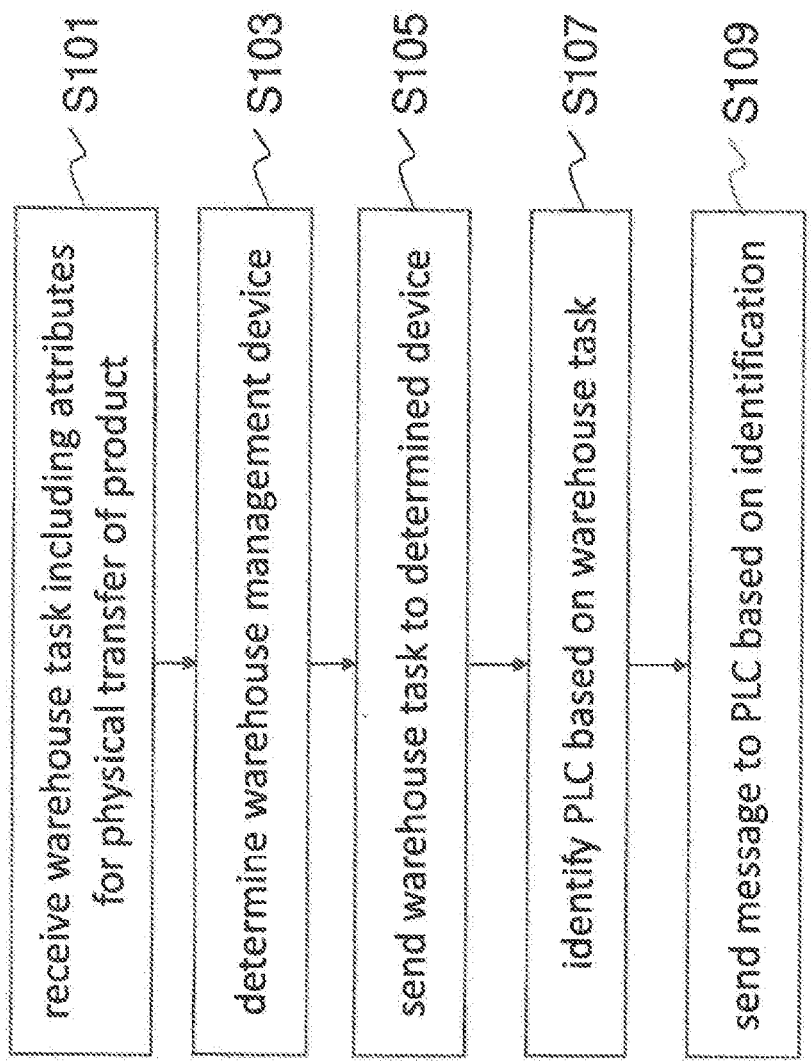
FIG. 1 shows a flow chart according to some embodiments.
Figure 2:
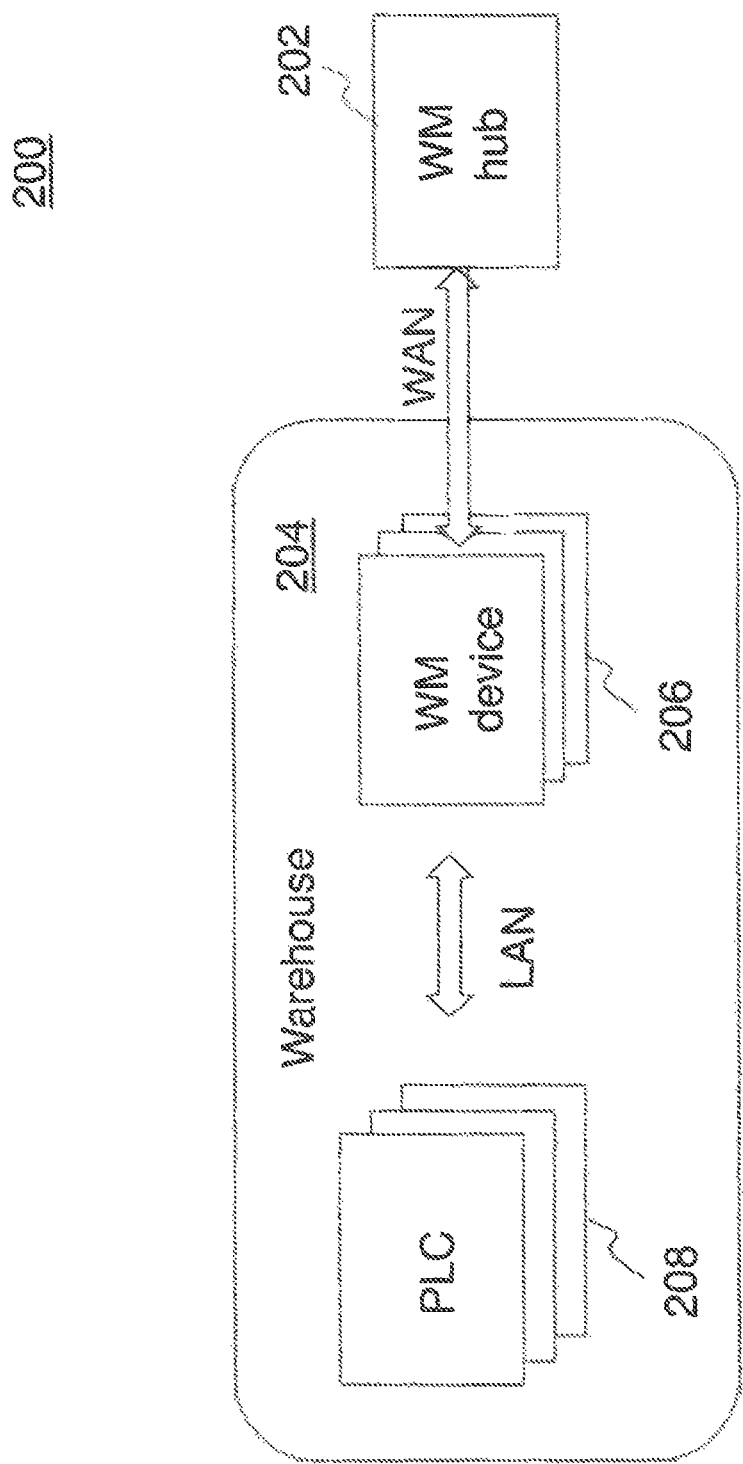
FIG. 2 shows an example of a distributed warehouse system.

FIG. 1 shows a flow chart of steps for distributing a warehouse task from a warehouse management hub to a programmable logic controller in a distributed warehouse system (e.g. the distributed warehouse system of FIG. 2).

At step S101, a warehouse task, including attributes for physically transferring a product into a warehouse (e.g., the attributes may specify one or more starting points where the product could be received and a destination or destination type where the product should be transferred), out of the warehouse (the attributes may specify a storage bin where the product is located and a destination to which the product should be transferred), or within the warehouse (the attributes may specify start and destination storage bins). In each case, the attributes may identify one or more products or HUs.

The warehouse task may be input at a terminal (e.g., via a web form) connected to the warehouse management hub or read from a file or data stream including multiple warehouse tasks. In addition, the warehouse task may be generated as a follow-up to a message (e.g., message regarding goods receipt triggers putaway warehouse task or message regarding wave release triggers picking warehouse task) or another warehouse task.

At step S103, the warehouse management hub determines or identifies one of a plurality of warehouse management devices for processing the warehouse task. The determination is made based on the attributes of the warehouse task. In addition, the determination may be made independently of the warehouse task, e.g., based on user input. The determined warehouse management device is located in a warehouse.

The warehouse management hub is connected to each of the plurality of warehouse management devices via a WAN (e.g., the Internet). In particular, the network latency of communications between the warehouse management hub and each of the warehouse management devices may be significant.

At step S105, the warehouse management hub sends the warehouse task to the warehouse management device determined at step S103 via the WAN.

At step S107, a PLC may be identified. The identified PLC is one of a plurality of PLCs in the same warehouse as the determined warehouse management device. The PLCs in the warehouse are connected to the determined warehouse management device via a LAN. The warehouse management device communicates with the PLCs via the LAN.

At step S109, the warehouse management device determined at S103 sends a message including information for carrying out the warehouse task to one of the PLCs in the warehouse based on the identification carried out in S107. In particular, the PLC receiving the message may be the identified PLC. Alternatively, the PLC receiving the message may be another PLC, e.g., if the identified PLC is unavailable.

FIG. 2 shows components of a distributed warehouse system 200. The distributed warehouse system 200 includes a warehouse management (WM) hub 202 and an automated warehouse 204. Located in the warehouse 204 is at least one warehouse management (WM) device 206 and a plurality of PLCs 208.

Although multiple WM devices 206 are shown in FIG. 2, in some cases, the warehouse may include only one WM device 206.

The WM hub 202 is connected to the WM device 206 via a WAN. The WM device 206 is connected to the PLCs 208 in the warehouse 204 via a LAN. The LAN may include wireless (e.g., IEEE 802.11) and/or wired (e.g., Ethernet/IEEE 802.3) components.

Although the distributed warehouse system 200 of FIG. 2 only shows one warehouse 204, multiple additional warehouses with corresponding warehouse management devices and PLCs may be included in the distributed warehouse system 200.

The WM device 206 may log communications with PLCs in a database local to the warehouse 204. Queries of the local database (e.g., PLC connection state, message log) may be executed via the WM hub 202, which may include rules for distributing the query to a corresponding WM device 206.

Different protocols may be used in communications between the PLCs 208 and the WM device 206 in comparison to communications between the WM device 206 and the WM hub 202. For example, WebSockets or another messaging protocol over TCP/IP may be used in communications within the warehouse 204. In contrast, the open data protocol (OData), or a similar protocol for interacting with web services via representational state transfer (REST) may be used in communications between the WM device 206 and the WM hub 202.

The WM hub 202 may distribute information to the WM device 206 as needed.

For example, the WM hub 202 may store information on 10,000 products. However, one WM device 206 might only be responsible for 100 of the 10,000 products. Accordingly, the WM hub 202 might only distribute warehouse tasks or routing configuration updates or other routing information to the WM device 206 related to the 100 products.

As another example, the WM hub 202 may be responsible for 100,000 destination storage bins. 80,000 of these storage bins are the responsibility of one WM device 206. However, only 1,000 of the 80,000 storage bins are empty. Therefore, only routing information for the empty 1,000 storage bins is distributed to the WM device 206.

An advantage of the depicted distributed warehouse management system 200 may be that many (if not most) requests from the PLCs 208 can be handled by the WM device 206. Because the requests from the PLCs are sent over the LAN and the WAN is not used, this results in more efficient operation of the warehouse 204. In some cases, approximately 75-80% of requests from the PLCs 208 can be handled directly by the WM device 206 and approximately 20-25% of the requests from the PLCs 208 require a further request from the WM device 206 to the WM hub 202.

Figure 3:
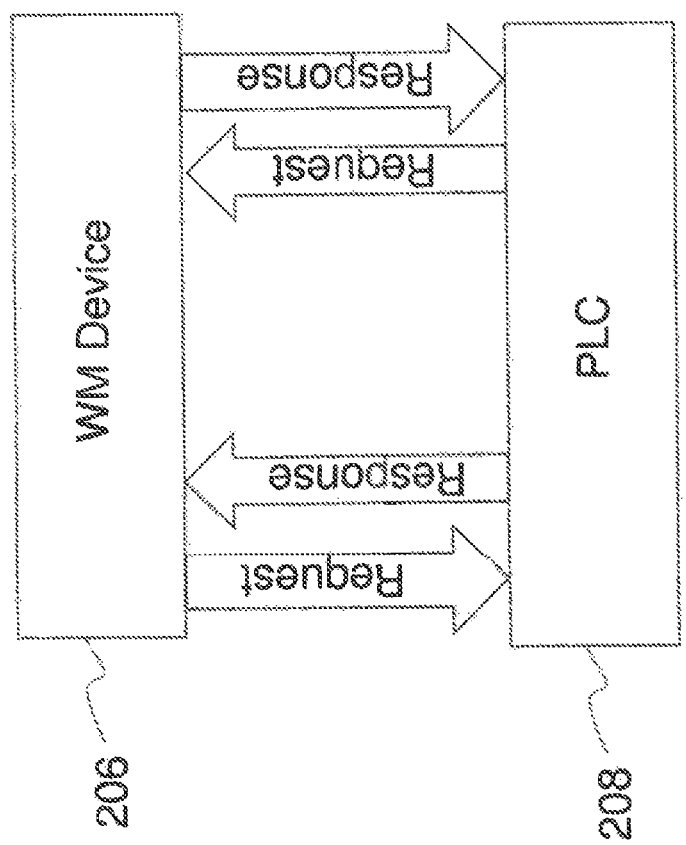
FIG. 3 shows interactions between a warehouse management device and a programmable logic controller.

FIG. 3 shows communications between the WM device 206 and the PLC 208. Requests may be bidirectional, i.e., the WM device 206 may send a request to the PLC 208 or the PLC 208 may send a request to the WM device 206.

The response may take the form of a confirmation upon completion of the request or a follow-up for further information in order to complete the request.

An exemplary telegram (i.e., a message) structure for telegrams exchanged between the WM device 206 and the PLC 208 is shown below:

|        | Field Name | Field Type | Length | Description |
|--------|------------|------------|--------|-------------|
| Header | sender     | c          | 6      | Sender of message |
|        | receiver   | c          | 6      | Receiver of message |
|        | filler     | c          | 2      |             |
|        | cp         | c          | 6      | Communication Point |
|        | teletype   | c          | 2      | Telegram Type |
|        | filler5    | c          | 4      |             |
|        | handshake  | c          | 1      | Handshake (request or acknowledgement) |
|        | filler6    | c          | 1      |             |
|        | mfs_error  | c          | 2      | Error code |
|        | seqno      | n          | 4      | Sequential number identifying a telegram |
|        | filler2    | c          | 4      |             |
| Item   | huident    | c          | 12     | Handling unit number |
|        | source     | c          | 20     | Source storage bin ID |
|        | dest       | c          | 20     | Destination storage bin ID |
|        | rsrc       | c          | 18     | Resource ID |
|        | hutyp      | c          | 4      | HU type (e.g. to have a size indicator) |
|        | hu_weight  | c          | 10     | Weight of HU |
|        | unit_huw   | c          | 3      | Unit of weight |
|        | hu_volume  | c          | 10     | Volume of HU |
|        | unit_huv   | c          | 3      | Unit of Volume |

The telegram structure includes a header and data describing an item (i.e., a HU). The telegram structure includes 20 fields, each identified by a field name, having a field type, a field length in bytes and a description of the field. The field type may be "c" for character or "n" for numeric; other types are also possible. The handling unit identifier is shown as a handling unit number. The resource ID ("rsrc") may identify a positioning system (e.g., a transfer car or a crane) for moving a HU from one communication point to another communication point in the warehouse.

FIG. 4 shows a geographical layout of the distributed warehouse system 200.

In the distributed warehouse system 200, the warehouse management hub 202 may be located in Germany. Physical warehouses (e.g., similar to the warehouse 204) and corresponding warehouse management devices 206 that are managed via the warehouse management hub 202 may be located in Spain and China (the warehouse management devices 206 are depicted outside the warehouses for ease of understanding, but could be located within the warehouses, e.g., in the interest of efficient communication).

When applying a conventional approach, the network latency for communications between Germany and Spain (e.g., about 30 ms RTT) might lead to significant delays in processing goods within the automated warehouse in Spain. Moreover, the long distance between Germany and China, e.g., about 250 ms RTT, could make effective management of the automated warehouse in China from the warehouse management hub 202 located in Germany impossible.

By using the warehouse management devices 206 to mitigate the network latency for communications to/from the warehouse management hub 202, e.g., so that many PLC requests are handled without querying the warehouse management hub 202, it may be possible to effectively manage the warehouses in Spain and China.

FIG. 5 shows a simplified example of moving a HU 500 within the automated warehouse 204.

In the example the HU 500 is a box "B". The HU 500 moves toward a decision point 502. One of the PLCs 208 may be located at or near the decision point 502. When the HU 500 reaches the decision point 502, the PLC 208 corresponding to the decision point 502 may send a request to the warehouse management device 206 asking which direction should be taken, i.e., toward a work center 504 or toward a communication point 506. The warehouse management device 206 decides based on the a routing configuration, one or more characteristics of the HU 500 (e.g., physical characteristics such as size or weight of the HU 500), state of a positioning system for moving the HU 500, warehouse tasks to be completed, etc. The decision of the warehouse management device 206 may be communicated in a response (e.g., a follow-up as opposed to a confirmation) to the PLC 208.

For example, if the warehouse management device 206 decides that the HU 500 should move toward the work center 504, the response may include instructions for the PLC 208 to cause the HU 500 to be conveyed to the work center 504 rather than the communication point 506.

The work center 504 may be a physical location in the warehouse used for activities such as the further processing of handling units. For example, activities such as deconsolidation, packing and packaging may be carried out at the work center 504.

FIG. 6 shows a more detailed example of the automated warehouse 204. FIG. 6A shows one half of the automated warehouse 204 and FIG. 6B shows the other half of the automated warehouse 304. FIG. 6 shows a functional, overhead view of the inside of the automated warehouse 204 with FIG. 6A being the left side and FIG. 6B being the right side.

Note that the example has been simplified and that a warehouse is typically much larger and more complex.

The example includes 5 aisles, each of the 5 aisles having corresponding destination storage bins and at least one positioning system (referred to as a resource) for positioning HUs (e.g., the HU 500) in the storage bins. In addition, the work center 504 is shown in more detail.

Also shown are communication points, including aisle determination points (with the prefix "AD"), after fact posting points (shown as L41, L55, L65, K20, K05, K09, K23, K26, K13), resource pick-up points (having the prefix "PS"), routing decision points (shown as K12, K08, K04, L26, L18, L17, L15, L14, L12, L11, L09, L08, L05, L06, L54, GR4), a clarification point (shown as N10) and starting points (shown as IP1 and IP2).

The aisles 1 to 5 have a corresponding storage type. In the example, the aisles have the same storage type, however, aisles in the warehouse 204 may have different storage types. A storage type categorizes a physical location in the warehouse 204 where a product can be placed for (possibly temporary) storage or where activities can be carried out on the product (as in the work center 504). Possible storage types include rack storage, bulk storage, general storage, fixed bin storage, hazardous substance storage, a work center, an ID point and pick up point, yard storage.

In one example, a box (HU) contains product A with batch 4711. In this example, storage capacity information is not maintained by the WM device 206. The box is to be stored in an automated high rack (a storage type). The box starts at IP1 or IP2 and should be stored in one of the aisles 1 to 5. To get there multiple communication points have to be passed. Initial communication points (and corresponding PLCs) can be passed based on routing information available to the WM device 206. No communication with the WM hub 202 is required. However, when deciding for a concrete storage bin of the high rack, the available storage capacity of the storage bins (i.e., the stock situation) should be considered. The storage bin capacity might only be known by the WM hub 202 (and not by the WM device 206). Therefore, at the aisle determination point (ADx) the WM device 206 may query the WM hub 202 to determine a destination storage bin based on the storage bin capacity for product A with batch 4711. Based on this information the box is routed to the correct aisle and moved to corresponding storage bin by the positioning system associated with the aisle. Upon confirmation that the box has been placed in the storage bin, a message may be sent to the WM hub 202, so that the storage capacity (stock information) can be updated there.

In another example conditions are similar to the previous example, particularly with regard to aisles and starting points. In this example (in contrast to the previous example), storage capacity (i.e., the stock situation) information is received from the WM hub 202 by the WM device 206 and maintained by the WM device 206. As in the previous example, the initial communication points can be negotiated based on the routing information maintained by the WM device 206. There no communication to the WM hub 202 is required. Even at the aisle decision point (ADx), upon receipt of a request from the corresponding PLC 208, the WM device 206 can decide locally (without a query to the WM hub 202), since the WM device 206 maintains the storage capacity information based on data received from the WM hub 202. Based on the information maintained by the WM device 206, the box is routed to the correct aisle. As in the previous example, upon confirmation that the box has been placed in a storage bin, a message may be sent to the WM hub 202, so that the storage capacity information can be updated there.

Another example below shows an exchange of telegrams carried out in order to move box (an example of a handling unit) MFS_MD_0001 (an example of a handling unit identifier) from starting point IP2 via several communication points and a resource pick-up point to Aisle 1. The starting point and the resource pick-up point may be considered types of communication points. In addition, the example shows logical acknowledgement of telegrams. A recipient of a telegram acknowledges receipt and takes over responsibility for further processing of the HU.

```
09:44:25,368[CCS001.1] SND [CCS001EWMQ2I IP2
    DR H 0012 MFS_MD_0001 IP2]
09:44:25,407[CCS001.1] RCV [EWMQ2ICCS001 IP2
    DR C 0012 MFS_MD_0001 IP2 0.000 0.000]
09:44:25,596[CCS001.1] RCV [EWMQ2ICCS001 IP2
    RT H 4728 MFS_MD_0001 LOOP 0.000 0.000]
09:44:25,597[CCS001.1] SND [CCS001EWMQ2I IP2
    RT C 4728 MFS_MD_0001 LOOP 0.000 0.000]
09:44:30,384[CCS001.1] SND [CCS001EWMQ2I AD2
    DR H 0013 MFS_MD_0001 AD2]
09:44:30,420[CCS001.1] RCV [EWMQ2ICCS001 AD2
    DR C 0013 MFS_MD_0001 AD2 0.000 0.000]
```

09:44:30,682[CCS001.1] RCV [EWMQ2ICCS001 AD2 RT H 4729 MFS_MD_0001 LOOP 0.000 0.000]
09:44:30,683[CCS001.1] SND [CCS001EWMQ2I AD2 RT C 4729 MFS_MD_0001 LOOP 0.000 0.000]
09:44:32,891[CCS001.1] SND [CCS001EWMQ2I L54 DR H 0014 MFS_MD_0001 L54]
09:44:33,195[CCS001.1] RCV [EWMQ2ICCS001 L54 DR C 0014 MFS_MD_0001 L54 0.000 0.000]
09:44:33,239[CCS001.1] RCV [EWMQ2ICCS001 L54 RT H 4730 MFS_MD_0001 0.000 0.000]
09:44:33,240[CCS001.1] SND [CCS001EWMQ2I L54 RT C 4730 MFS_MD_0001 LOOP 0.000 0.000]
09:44:34,397[CCS001.1] SND [CCS001EWMQ2I L05 DR H 0015 MFS_MD_0001 L05]
09:44:34,445[CCS001.1] RCV [EWMQ2ICCS001 L05 DR C 0015 MFS_MD_0001 L05 0.000 0.000]
09:44:34,472[CCS001.1] RCV [EWMQ2ICCS001 L05 RT H 4731 MFS_MD_0001 PS1 0.000 0.000]
09:44:34,473[CCS001.1] SND [CCS001EWMQ2I L05 RT C 4731 MFS_MD_0001 PS1 0.000 0.000]
09:44:34,899[CCS001.1] SND [CCS001EWMQ2I PS1 DR H 0016 MFS_MD_0001 PS1]
09:44:35,621[CCS001.1] RCV [EWMQ2ICCS001 PS1 DR C 0016 MFS_MD_0001 PS1 0.000 0.000]
09:44:37,238[MLS001.1] RCV [EWMMFSMDRF00 TM H 5091 MFS_MD_0001 PS1 SRM00 1 0.000 0.000]
09:44:37,239[MLS001.1] SND [MDRF00EWMMFS TM C 5091 MFS_MD_0001 PS1 SRM01 C1 0.000 0.000]
09:44:37,973[MLS001.1] SND [MLS001EWMQ2I MR H 0004 MFS_MD_0001 PS1 SRM01]
09:44:38,117[MLS001.1] RCV [EWMQ2IMLS001 MR C 0004 MFS_MD_0001 PS1 SRM01 0.000 0.000]
09:44:39,995[MLS001.1] RCV [EWMMFSMDRF00 TM H 5092 MFS_MD_0001 MDR1-01-1-1-001-0104SRM01 C1 0.000 0.000]
09:44:39,997[MLS001.1] SND [MDRF00EWMMFS TM C 5092 MFS_MD_0001 MDR1-01-1-1-001-0104SRM01 C1 0.000 0.000]
09:44:40,179[MLS001.1] SND [MLS001EWMQ2I MR H 0005 MFS_MD_0001 PS1 MDR1-01-1-1-001-0104SRM01]
09:44:40,219[MLS001.1] RCV [EWMQ2IMLS001 MR C 0005 MFS_MD_0001 PS1 MDR1-01-1-1-001-0104SRM01 0.000 0.000]

The following telegram types are shown above:
DR=destination request,
RT=routing information (giving directions to a PLC),
TM=task movement,
MR=movement response (task confirmation of the PLC).

The fields correspond to the exemplary telegram structure shown in the context of FIG. 3. In some cases (e.g., for some telegram types) fields from the table are missing or fillers are not shown. For example, types DR and RT include communication points (e.g., AD2, PS1, L05, L54), whereas types TM and MR do not.

The invention claimed is:

1. A computer-implemented method for distributing at least one warehouse task from a warehouse management hub to one of a plurality of programmable logic controllers in a distributed warehouse system, comprising:
sending, by the warehouse management hub, an initial configuration to a warehouse management device, the initial configuration comprising routing information, the routing information including a plurality of sources and a plurality of destinations within a warehouse and at least one programmable logic controller located between each source of the plurality of sources and each destination of the plurality of destinations;
receiving, by the warehouse management hub, state information from the warehouse management device, the state information comprising one or more of:
a state of sources and destinations within the warehouse,
a state of positioning systems within the warehouse,
a state of handling units within the warehouse, and
a state of each communication point or a subset of communication points in the warehouse;
transmitting an update to the initial configuration to the warehouse management device based on the state information;
receiving the warehouse task at the warehouse management hub, the warehouse task including attributes for physically transferring at least one product into a warehouse, out of the warehouse or within the warehouse;
determining, by the warehouse management hub and based on the attributes of the warehouse task, the warehouse management device from a plurality of warehouse management devices for processing the warehouse task, wherein the warehouse management hub is located remote from each of the warehouse management devices, the warehouse hub being communicably coupled to each of the warehouse management devices via a wide area network;
sending, by the warehouse management hub, the warehouse task to the determined warehouse management device;
identifying, by the determined warehouse management device and based on the attributes of the warehouse task and on the updated initial configuration, a first one of the plurality of programmable logic controllers, wherein the determined warehouse management device is communicably connected to each of the programmable logic controllers via a local area network; and
sending, by the determined warehouse management device, a message including information for carrying out the warehouse task to one of the programmable logic controllers based on the identification of the first one of the programmable logic.

2. The method of claim 1, wherein determining one of the warehouse management devices for processing the warehouse task is based on one or more of the following:
a characteristic of the product,
a characteristic of the handling unit containing the product,
a destination specified by the warehouse task.

3. The method of claim 2, wherein each warehouse management device is responsible for a specified set of destinations,
wherein each destination has one or more destination characteristics,
wherein the warehouse management device is determined by comparing at least one of the destination characteristics with the characteristic of the handling unit.

4. The method of claim 3, wherein the information included in the message comprises one or more of the following: a handling unit identifier, a source identifier, a destination identifier, a handling unit type, a handling unit weight, a handling unit volume.

5. The method of claim 1,
wherein sending the message to the one of the programmable logic controllers comprises using Transmission Control Protocol (TCP), wherein the message has a fixed size or a boundary of the message is delimited.

6. The method of claim 1, further comprising:
receiving, by the determined warehouse management device from one of the programmable logic controllers, an error message;
determining, by the determined warehouse management device, a second one of the programmable logic controllers based on the error message;
wherein sending the message including information for carrying out the warehouse task is based on the determination of the second one of the programmable logic controllers.

7. The method of claim 1, further comprising:
receiving, by the determined warehouse management device, location information about handling units in the warehouse from the programmable logic controllers;
forwarding a subset of the location information from the determined warehouse management device to the warehouse management hub.

8. The method of claim 7, wherein the forwarding is carried out as soon as the location information is received by the determined warehouse management device and/or the subset includes all of the location information, or
the subset of the location information is limited to location information from a proper subset of the programmable logic controllers, wherein the programmable logic controllers of the proper subset are associated with destinations in the warehouse.

9. The method of claim 1, further comprising:
updating, by the warehouse management device, the warehouse management hub regarding a state of the programmable logic controllers managed by the warehouse management device,
wherein the state of the programmable logic controllers comprises:
one or more connection states of the programmable logic controllers, and/or
a state of one or more sources or destinations managed by the warehouse management device.

10. The method of claim 1, further comprising:
registering, by the warehouse management device, with the warehouse management hub,
sending, by the warehouse management hub, the initial configuration to the warehouse management device in response to the registration, the initial configuration comprising:
definitions of the programmable logic controllers managed by the warehouse management device, each definition including information for sending messages to the respective programmable logic controller;
routing information including:
sources and destinations in the warehouse,
at least one programmable logic controller in between each source and destination.

11. The method of claim 1, wherein the attributes of the warehouse task include one or more of the following:
at least one handling unit identifier and/or at least one product identifier,
a source identifier, and
a destination identifier or a destination type,
wherein the destination type is associated with attributes of handling units that can be processed at destinations associated with the destination type.

12. The method of claim 1, further comprising:
receiving, at the determined warehouse management device, a status message from one of the programmable logic controllers corresponding to a decision point in the warehouse, the status message indicating that a handling unit has arrived at the programmable logic controller;
sending, from the determined warehouse management device, a response message including routing instructions to the programmable logic controller in response to the status message,
wherein the routing instructions are computed from:
routing data that was on the warehouse management device at the time the status message was received, or
routing data received from the warehouse management hub after the status message was received;
wherein the routing instructions specify another programmable logic controller.

13. A non-transitory computer-readable medium storing instructions that are executable by a computer to cause the computer to:
sending, by a warehouse management hub, an initial configuration to a warehouse management device, the initial configuration comprising routing information, the routing information including a plurality of sources and a plurality of destinations within a warehouse and at least one programmable logic controller located between each source of the plurality of sources and each destination of the plurality of destinations;
receive, by the warehouse management hub, state information from the warehouse management device, the state information comprising one or more of:
a state of sources and destinations within the warehouse,
a state of positioning systems within the warehouse,
a state of handling units within the warehouse, and
a state of each communication point or a subset of communication points in the warehouse;
transmit an update to the initial configuration to the warehouse management device based on the state information;
receive a warehouse task at a warehouse management hub, the warehouse task including attributes for physically transferring at least one product into a warehouse, out of the warehouse or within the warehouse;
determine, by the warehouse management hub and based on the attributes of the warehouse task, the warehouse management device from a plurality of warehouse management devices for processing the warehouse task, wherein the warehouse management hub is located remote from each of the warehouse management devices, the warehouse hub being communicably coupled to each of the warehouse management devices via a wide area network;
send, by the warehouse management hub, the warehouse task to the determined warehouse management device;
identify, by the determined warehouse management device and based on the attributes of the warehouse task and on the updated initial configuration, a first one of a plurality of programmable logic controllers, wherein the determined warehouse management device is communicably connected to each of the programmable logic controllers via a local area network; and
send, by the determined warehouse management device, a message including information for carrying out the warehouse task to one of the programmable logic controllers based on the identification of the first one of the programmable logic controllers.

14. The medium of claim 13, wherein determination of one of the warehouse management devices for processing the warehouse task is based on one or more of the following:
a characteristic of the product,
a characteristic of the handling unit containing the product, and
a destination specified by the warehouse task,
wherein each warehouse management device is responsible for a specified set of destinations,
wherein each destination has one or more destination characteristics,
wherein the warehouse management device is determined by comparing at least one of the destination characteristics with the characteristic of the handling unit, and
wherein the information included in the message comprises one or more of the following: a handling unit identifier, a source identifier, a destination identifier, a handling unit type, a handling unit weight, a handling unit volume.

15. The medium of claim 13, where the instructions, when the program is executed by a computer, cause the computer to:
receive, by the determined warehouse management device, location information about handling units in the warehouse from the programmable logic controllers; and
forward a subset of the location information from the determined warehouse management device to the warehouse management hub,
wherein the forwarding is carried out as soon as the location information is received by the determined warehouse management device and/or the subset includes all of the location information, or
the subset of the location information is limited to location information from a proper subset of the programmable logic controllers, wherein the programmable logic controllers of the proper subset are associated with destinations in the warehouse.

16. The medium of claim 13, where the instructions, when the program is executed by a computer, cause the computer to:
update, by the warehouse management device, the warehouse management hub regarding a state of the programmable logic controllers managed by the warehouse management device,
wherein the state of the programmable logic controllers comprises:
one or more connection states of the programmable logic controllers, and/or
a state of one or more sources or destinations managed by the warehouse management device.

17. A distributed warehouse management system for distributing at least one warehouse task from a warehouse management hub to one of a plurality of programmable logic controllers, the system comprising:
the warehouse management hub;
a plurality of warehouse management devices, wherein each warehouse management device is connected to the warehouse management hub via a wide area network;
the plurality of programmable logic controllers, wherein each programmable logic controller is connected to one of the warehouse management devices via a local area network;
wherein the warehouse management hub is configured to:
send an initial configuration to a warehouse management device, the initial configuration comprising routing information, the routing information including a plurality of sources and a plurality of destinations within a warehouse and at least one programmable logic controller located between each source of the plurality of sources and each destination of the plurality of destinations;
process state information received from each of the plurality of warehouse management devices, the state information comprising one or more of:
a state of sources and destinations within the warehouse,
a state of positioning systems within the warehouse,
a state of handling units within the warehouse, and
a state of each communication point or a subset of communication points in the warehouse;
transmit an update to the initial configuration to the warehouse management device based on the state information;
receive the warehouse task, the warehouse task including attributes for physically transferring at least one product into a warehouse, out of the warehouse or within the warehouse;
determine, based on the attributes of the warehouse task, the warehouse management device from the warehouse management devices for processing the warehouse task;
send, the warehouse task to the determined warehouse management device; and
wherein the determined warehouse management device is configured to:
identify, based on the attributes of the warehouse task and on the updated initial configuration, a first one of the programmable logic controllers; and
send a message including information for carrying out the warehouse task to one of the programmable logic controllers based on the identification of the first one of the programmable logic controllers.

18. The system of claim 17, wherein determination of one of the warehouse management devices for processing the warehouse task is based on one or more of the following:
a characteristic of the product,
a characteristic of the handling unit containing the product, and
a destination specified by the warehouse task,
wherein each warehouse management device is responsible for a specified set of destinations,
wherein each destination has one or more destination characteristics,
wherein the warehouse management device is determined by comparing at least one of the destination characteristics with the characteristic of the handling unit, and
wherein the information included in the message comprises one or more of the following: a handling unit identifier, a source identifier, a destination identifier, a handling unit type, a handling unit weight, a handling unit volume.

19. The system of claim 17, wherein the warehouse management hub is further configured to:
receive, by the determined warehouse management device, location information about handling units in the warehouse from the programmable logic controllers; and
forward a subset of the location information from the determined warehouse management device to the warehouse management hub,
wherein the forwarding is carried out as soon as the location information is received by the determined warehouse management device and/or the subset includes all of the location information, or the subset of the location information is limited to location information from a proper subset of the programmable logic controllers, wherein the programmable logic controllers of the proper subset are associated with destinations in the warehouse.

\* \* \* \* \*